(12) United States Patent
Hekal

(10) Patent No.: US 7,435,704 B2
(45) Date of Patent: Oct. 14, 2008

(54) OXYGEN ABSORBER

(76) Inventor: Ihab M. Hekal, 230 Round Hill Rd., Greenwich, CT (US) 06831

(*) Notice: Subject to any disclaimer, the term of this patent is extended or adjusted under 35 U.S.C. 154(b) by 553 days.

(21) Appl. No.: 10/796,145

(22) Filed: Mar. 10, 2004

(65) Prior Publication Data

US 2005/0202968 A1   Sep. 15, 2005

(51) Int. Cl.
*B01J 20/02* (2006.01)

(52) U.S. Cl. .................. 502/406; 502/338; 502/439

(58) Field of Classification Search ............. 502/406, 502/439, 401, 402, 229, 338
See application file for complete search history.

(56) References Cited

U.S. PATENT DOCUMENTS

| | | | | |
|---|---|---|---|---|
| 5,241,149 A | * | 8/1993 | Watanabe et al. | 219/725 |
| 6,369,148 B2 | * | 4/2002 | Chiang et al. | 524/417 |
| 6,465,065 B1 | * | 10/2002 | Teumac et al. | 428/35.7 |

* cited by examiner

*Primary Examiner*—Edward M Johnson
(74) *Attorney, Agent, or Firm*—William H. Holt

(57) ABSTRACT

An oxygen absorber includes an iron powder, and a first layer coated on a surface of the iron powder and formed of iron chloride through a chemical reaction. Further, the oxygen absorber includes a matrix material filled with the iron powder covered with the first layer of iron chloride. It is possible to coat the first layer on the surface of the iron powder with a second layer to obtain more uniform coating.

18 Claims, No Drawings

OXYGEN ABSORBER

BACKGROUND OF THE INVENTION AND RELATED TECHNICAL FIELD

The present invention relates to an oxygen absorber. More particularly, the present invention relates to a composition of an oxygen absorber with improved oxygen absorption performance.

An oxygen absorber is a material capable of absorbing oxygen from surrounding atmosphere. Conventionally, the oxygen absorber has been used for protecting packaged foods and other products against spoilage, mold growth, color change, rancidity, loss of a nutritive value, insect damage and loss of quality. The oxygen absorber has been also used for protecting a metal product against corrosion, an antique wood against deterioration, a chemical and drug against oxidation, and so on.

The oxygen absorber has been produced in a variety of forms such as a packet form, powder, a pellet, a sheet and a tablet according to applications thereof. When the oxygen absorber is retained in a sealed packaging of food, the oxygen absorber absorbs oxygen inside the sealed packaging and maintains the oxygen content at a low level.

In the food storage industry, the use of the oxygen absorber has been critical for increasing a storage life of foods for a long-term storage. There have been two types of oxygen absorbers used for the storage of food. The first type requires moisture from surrounding atmosphere or food to perform the absorption. The second type contains moisture and is suitable for dry pack canning with low moisture. The first type works slower as the oxygen absorber must first absorb moisture before absorbing any oxygen. Because the second type contains moisture, the oxygen absorber starts absorbing oxygen immediately and tends to last a shorter period of time as compared with the first type. These characteristics are selected according to the applications.

The oxygen absorber performs the oxygen absorbing action through a chemical reaction as follows:

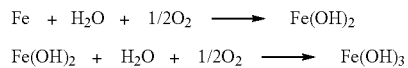

A typical conventional oxygen absorber contains iron powder, and the iron powder reacts with oxygen in the surrounding atmosphere, thereby causing the iron powder to rust. When a surface of the iron powder has oxidized, the absorbing action stops. Therefore, it is necessary to use fine iron powder with a large surface area to absorb a large quantity of oxygen.

In order to promote the reaction of the iron, it is sometimes tried to add an electrolyte such as sodium chloride or other alkaline or alkaline earth metal chloride. Also, to provide water necessary for the reaction, it has been tried to add a component such as activated carbon and silica gel for releasing water.

U.S. Pat. No. 5,721,187 has disclosed an oxygen absorber comprising an active carbon material layer and an oxygen absorbing layer comprising 15 to 80% by weight of a thermoplastic resin and 85 to 20% by weight of an oxygen absorbing agent. An amount of the active carbon material is 0.2 to 15% by weight relative to the oxygen absorbing agent. The oxygen absorber is easy to handle and excellent in oxygen absorbing performance. However, a rate of absorbing oxygen has been found not fast enough for a certain application U.S. Pat. No. 6,586,514 has disclosed a composition comprising an oxidizable metal component, an electrolyte component and a non-electrolytic acidifying component. When the composition is blended with a flexible polymeric resin, it is possible to obtain good oxygen-absorbing performance with improved oxidation efficiency as compared with a rigid thermoplastic resin. The non-electrolytic acidifying component needs to be thermally stable under a condition of melt compounding with the polymeric resin, particularly for an extrusion coating application. Further, the efficiency of absorbing oxygen has not been high enough. Also, the composition includes three different components, resulting in complex material handling and manufacturing process.

SUMMARY OF THE INVENTION

In view of the problems described above, the present invention has been made. The object of the invention is to provide an oxygen absorber having a simple composition with an improved efficiency of absorbing oxygen. The present invention provides an oxygen absorber with a reduced cost and without the complexity in material handling and manufacturing process.

In order to achieve the objects described above, according to the present invention, an oxygen absorber includes an iron powder, and a first layer of iron chloride coated on a surface of the iron powder. Further, an oxygen absorber according to the invention includes a matrix material filled with the iron powder covered with iron chloride through a chemical reaction or other methods.

In the invention, the oxygen absorber is the matrix material filled with the iron powder coated with the iron chloride. Accordingly, the oxygen absorber comprises two major components, thereby eliminating the complex material handling and manufacturing process. The iron powder is coated with the iron chloride through a reaction between iron and hydrochloric acid. Alternatively, anhydrous ferric chloride is dissolved in ether or alcohol to obtain a coating solution, and the iron powder is added in the solution to coat the surface thereof with ferric chloride. It is also possible to mix the iron powder with solid anhydrous ferric chloride in an intensive mixer so that a chemical reaction between the iron and the ferric chloride takes place on the surface of the iron powder to form the first layer.

According to the present invention, the iron powder may have an average diameter of less than 100 micrometers, and may be sponge iron powder with porous surface. Further, the iron powder may be carbonyl iron powder with an average diameter of less than 20 micrometers.

According to the present invention, the first layer is formed of anhydrous ferric chloride, and is coated on the iron powder such that a ratio of chloride to iron is 0.1% to 10% by weight. The first layer may have a thickness of less than 100 nanometer.

According to the present invention, the matrix material is a plastic having a melting point of 80° C. to 300° C. such as polyethylene, polypropylene, polystyrene, nylon, polyesters, polycarbonate, polyvinylchloride, and the like. The matrix material may be filled with the iron powder at 50% to 90% by weight.

DETAILED DESCRIPTION OF PREFERRED EMBODIMENTS

Hereunder, embodiments of the present invention will be explained.

According to the present invention, an oxygen absorber includes an iron powder, and a first layer of iron chloride coated on a surface of the iron powder through a chemical reaction. Further, an oxygen absorber includes a matrix material filled with the iron powder covered with iron chloride.

When iron exists with iron chloride, the following reaction will occur.

$$Fe + FeCl_2 \longrightarrow Fe_2Cl_2 \tag{1}$$

$$Fe_2Cl_2 + H_2O + 1/2O_2 \longrightarrow Fe(OH)_2 + FeCl_2 \tag{2}$$

In reaction (1), $Fe_2Cl_2$ is a part of iron crystal lattice and unstable, and reaction (2) takes place at a fast rate. As it can be seen, the iron chloride is not consumed through the reactions. Accordingly, a small amount of iron chloride would be enough for the reactions.

In the conventional system, sodium chloride has been used to supply electrolyte as follows.

$$2NaCl + H_2O \longrightarrow 2Na^+ + 2Cl^- \tag{3}$$

$$2Cl^- + Fe + 1/2O_2 \longrightarrow FeCl_2 + 2OH^- \tag{4}$$

$$FeCl_2 + 2Na^+ + 2OH^- \longrightarrow Fe(OH)_2 + 2NaCl \tag{5}$$

As compared with reaction (2), reaction (4) progresses at a very slow rate, resulting in undesirable efficiency of absorbing oxygen. Further, commercial iron powders are covered with oxide, therefore it takes a relatively long period of time for acid to penetrate into the oxide layer. According to the present invention, it is possible to facilitate the process of penetrating into the iron crystal lattice.

In the embodiment of the present invention, it is preferred to use fine sponge iron powder with relatively large surface area. The fine sponge iron powder can be made through hydrogen reduction of powder iron oxide in solid state. The powder is then classified by size, since finer powder is more suitable for the application. The iron oxide is obtained as a byproduct in a steel manufacturing process by scalping a steel ingot. The obtained iron oxide is then dried and ground to fine iron oxide powder. The fine iron oxide powder is heated to remove any moisture before being transferred to the next step.

As an example of a process of manufacturing the fine iron powder, an iron oxide byproduct in a steel mill as a result of scalping steel ingot is dried and grind to fine iron oxide powder. The iron oxide is then heated to remove any moisture. In a special continuous belt oven, the iron oxide is heated while hydrogen is introduced. An exothermic chemical reaction takes place according to the following equation:

$$Fe_3O_4 + 2H_2 \longrightarrow 3Fe + 2H_2O \tag{6}$$

The formed iron is spongy and the particles have a relatively large surface area as compared to solid beads. The powder is then classified to different mesh sizes by passing the iron powder through a series of screens. It may be preferred to use the finest iron powder of 325 mesh (about 50 micrometers in diameter). In general, the finer the powder is, the larger the surface area becomes, resulting in a higher rate of the reaction. For some specific application, it is possible to use micronized iron powder (about 10 micrometers in diameter) or carbonyl iron (about 3–5 micrometers in diameter) provided that cost is not an issue.

The fine iron powder is then coated with iron chloride with one of several methods. The fine iron powder can be reacted with hydrochloric acid to form iron chloride on a surface according to reaction (7). Alternatively, the iron powder can be coated with anhydrous ferric chloride dissolved in ether or alcohol. Further, the iron powder may be mixed with solid anhydrous ferric chloride in an intensive mixer so that a chemical reaction takes place on the iron powder surface between the iron and the ferric chloride to form ferrous chloride on the metallic iron powder surface as shown in reaction (8).

$$2HCl + Fe \longrightarrow FeCl_2 + H_2 \tag{7}$$

$$2FeCl_3 + Fe \longrightarrow 3FeCl_2 \tag{8}$$

Other methods of forming iron chloride on the powder surface include mixing molten ferric chloride hexahydrate with iron powder at 100-200° F., so that ferric chloride hexahydrate ($FeCl_2.6H_2O$) is formed on the surface of the iron powder. It is preferred that the iron chloride layer is formed through a chemical reaction so that the iron chloride layer becomes a part of the iron crystal lattice. Accordingly, it takes a relatively short period of time for the iron chloride layer to penetrate into the oxide layer on the iron particles to get the reaction started.

A ratio of the iron chloride to the metallic iron is preferably 0.1 to 10% by weight. The ferrous chloride absorbs moisture from air to form tetra hydrate. In the presence of oxygen, the ferrous chloride tetra hydrate is oxidized to form ferric chloride. The ferric chloride absorbs moisture from air to form ferric chloride hexahydrate. The ferric chloride hexahydrate is deliquescent and keeps absorbing moisture to become liquid.

It is possible to divide the process of coating the surface of the iron powder into two separate steps, i.e. the first step of forming the first layer and the second step of forming the second layer. The two-step process may be employed when it is desirable to obtain a thicker and/or more uniform coating. It is possible to perform the first step and the second step using the same process, or perform the first step and the second step using different steps.

According to the present invention, the iron power coated with iron chloride can be filled in a matrix material. In the process of producing a material filled with the oxygen absorber of the present invention, the iron powder coated with iron chloride is fed into an extruder and mixed with a melted polymer at a temperature above a melting point of the polymer. The polymer for this purpose includes polypropylene, polyethylene, polystyrene, polyvinylchloride, and the like. A twin-screw extruder is preferred to provide good dispersion and smooth surface. During the extrusion, excessive moisture and chloride are removed by applying a vacuum through a venting port.

Other method of forming the iron chloride layer is feeding a polymer and iron powder into a twin-screw extruder and injecting hydrochloric acid or molten ferric chloride hexahydrate to react directly with the iron powder in the extruder to form iron chloride on the powder surface. Undesirable reaction by-product is removed from the extruder through a vacuum vent. In that case, it is necessary for the twin-screw extruder to be able to handle hydrochloric acid and molten ferric chloride hexahydrate.

The oxygen absorber formed of the iron power and the matrix is extruded into strands, and passes through a water bath to obtain pellets.

A concentration of the iron powder coated with iron chloride in the oxygen absorber is normally between 50 and 95% by weight, preferably between 70 to 85% by weight. The oxygen absorber containing 70% iron powder coated with iron chloride will theoretically absorb 200 cc of oxygen per gram. The oxygen absorber can be formed in a disk shape to be filled in a small canister, or a sachet to be placed in a package.

According to the present invention, the oxygen absorber can be mixed with other plastic in a structure of a barrier container for absorbing oxygen in a headspace of the container. In a barrier container combined with a vinyl alcohol, the oxygen absorber of the invention can be added to an adhesive layer adjacent to a layer formed of the vinyl alcohol, or in a layer between a food contact layer and the adhesive layer. Because of the high oxygen absorbing capacity of the oxygen absorber, a container can be formed of a three-layer structure using two extruders to store a food product without a need for a complex co-extrusion setup to use a barrier material.

EXAMPLE 1

Hydrogen reduced iron powder with 325 mesh size and anhydrous ferric chloride were mixed in a Henshel mixer at a 98/2 weight ratio for four minutes. The resultant iron powder coated with iron chloride was mixed with polypropylene copolymer SB786 from Basel Corp. at a weight ratio of 72/28, and the mixture was fed into a twin-screw extruder.

The mixture was extruded at a barrel temperature of 400° F. and pelletized into pellets as oxygen absorber.

10 g and 0.1 g of the oxygen absorber were placed in a one-liter empty jar containing 21% of oxygen, or 210 cc of oxygen. The oxygen content in the jar was measured after one, three and five days to evaluate the oxygen absorption performance as an amount of oxygen (cc) per one gram of the oxygen absorber. The same test was repeated three times for each 10 g and 0.1 g samples. The result is shown in Table 1.

TABLE 1

| Sample ID | sample weight (g) | Oxygen content (%) | | | Absorbed Oxygen (cc/g) | | |
|---|---|---|---|---|---|---|---|
| | | 0 day | 1 day | 3 days | 5 days | 1 day | 3 days | 5 days |
| A | 1.02 | 20.8 | 19.2 | 17.6 | 16.6 | 6.9 | 13.8 | 18.1 |
| B | 1.02 | 20.8 | 19.0 | 17.4 | 16.3 | 7.8 | 14.7 | 19.4 |
| C | 1.02 | 20.8 | 19.0 | 17.4 | 16.2 | 7.8 | 14.7 | 19.8 |
| D | 0.10 | 20.7 | 20.4 | 20.3 | 20.1 | 13.2 | 17.8 | 26.4 |
| E | 0.11 | 20.7 | 20.3 | 20.3 | 20.1 | 16.0 | 16.0 | 24.0 |
| F | 0.10 | 20.7 | 20.3 | 20.3 | 20.1 | 17.8 | 17.8 | 22.0 |

EXAMPLE 2

The oxygen absorber described above was mixed with polypropylene (PP) and high-density polyethylene (HDPE) at a weight ratio of 10/90, and the mixtures were extruded into films. The same test used for example 1 was performed to evaluate the oxygen absorption performance of the films as an amount of oxygen (cc) per one gram of the oxygen absorber for up to 35 days. The result is shown in Table 2.

TABLE 2

| | Absorbed Oxygen (cc/g) | | | | | | |
|---|---|---|---|---|---|---|---|
| Sample | 0 day | 1 day | 5 days | 10 days | 15 days | 25 days | 35 days |
| PP | 0.0 | 9.2 | 21.4 | 28.1 | 32.4 | 37.5 | 42.4 |
| HDPE | 0.0 | 12.2 | 29.8 | 32.4 | 35.0 | 40.6 | 43.9 |

As described above, according to the present invention, it is possible to provide the oxygen absorber with high oxygen absorption performance.

The invention has been explained with reference to the specific embodiments of the invention. However, the invention is not limited to the embodiments described above, and is limited only by the claims.

I claim:

1. An oxygen absorber comprising:
   an iron powder, and
   a first layer coated on a surface of the iron powder, said first layer being formed of iron chloride.

2. An oxygen absorber according to claim 1, further comprising a matrix material filled with the iron powder covered with the first layer.

3. An oxygen absorber according to claim 1, wherein said iron powder is sponge iron powder with porous surface.

4. An oxygen absorber according to claim 1, wherein said iron powder has an average diameter of less than 100 micrometers.

5. An oxygen absorber according to claim 1, wherein said iron powder is carbonyl iron powder with an average diameter of less than 20 micrometers.

6. An oxygen absorber according to claim 1, wherein said first layer is formed of at least one of anhydrous ferric chloride and ferrous chloride.

7. An oxygen absorber according to claim 1, wherein said first layer is coated on the iron powder such that a ratio of chloride to iron is 0.1% to 10% by weight.

8. An oxygen absorber according to claim 1, wherein said first layer has a thickness of less than 100 nm.

9. An oxygen absorber according to claim 2, wherein said matrix material is a plastic having a melting point of 80° C. to 300° C.

10. An oxygen absorber according to claim 2, wherein said matrix material is filled with the iron powder at 50% to 90% by weight.

11. An oxygen absorber according to claim 1, further comprising a second layer coated on the first layer formed on the surface of the iron powder and formed of iron chloride.

12. An oxygen absorber according to claim 11, wherein said second layer is formed of at least one of anhydrous ferric chloride, ferrous chloride hexahydrate, ferrous chloride, and ferrous chloride tetrahydrate.

13. A method of manufacturing an oxygen absorber, comprising the steps of:
   preparing iron powder, and
   forming a first layer formed of iron chloride on a surface of the iron powder.

14. A method of manufacturing an oxygen absorber according to claim 13, further comprising the step of mixing the iron powder and a matrix material, melting the mixture of the iron powder and the matrix material, extruding the molten mixture into a strand, pelletizing the extruded strand, and molding the pellet into a predetermined shape.

15. A method of manufacturing an oxygen absorber according to claim 13, further comprising the step of forming a second layer formed of iron chloride on the first layer formed on the surface of the iron powder.

16. A method of manufacturing an oxygen absorber, comprising the steps of:

preparing iron powder, and forming a first layer formed of iron chloride on a surface of the iron powder, further comprising the step of mixing the iron powder and a matrix material, melting the mixture of the iron powder and the matrix material, extruding the molten mixture into a strand, pelletizing the extruded strand, and molding the pellet into a predetermined shape, wherein said step of forming the first layer is performed by injecting hydrochloric acid or molten ferric chloride hexahydrate to react directly with the iron powder in an extruder while melting the mixture of the iron powder and the matrix material.

17. A method as defined in claim 16 including the step of mixing said oxygen absorber with other plastic material, and forming a container therefrom, wherein the oxygen absorber functions as a barrier against the passage of oxygen.

18. A method as defined in claim 13 including the step of mixing said oxygen absorber with other plastic material, and forming a container therefrom, wherein the oxygen absorber functions as a barrier against the passage of oxygen.

* * * * *